Aug. 7, 1962  W. B. PEGRAM  3,048,040
PRESSURE RESPONSIVE DEVICE
Filed May 5, 1959
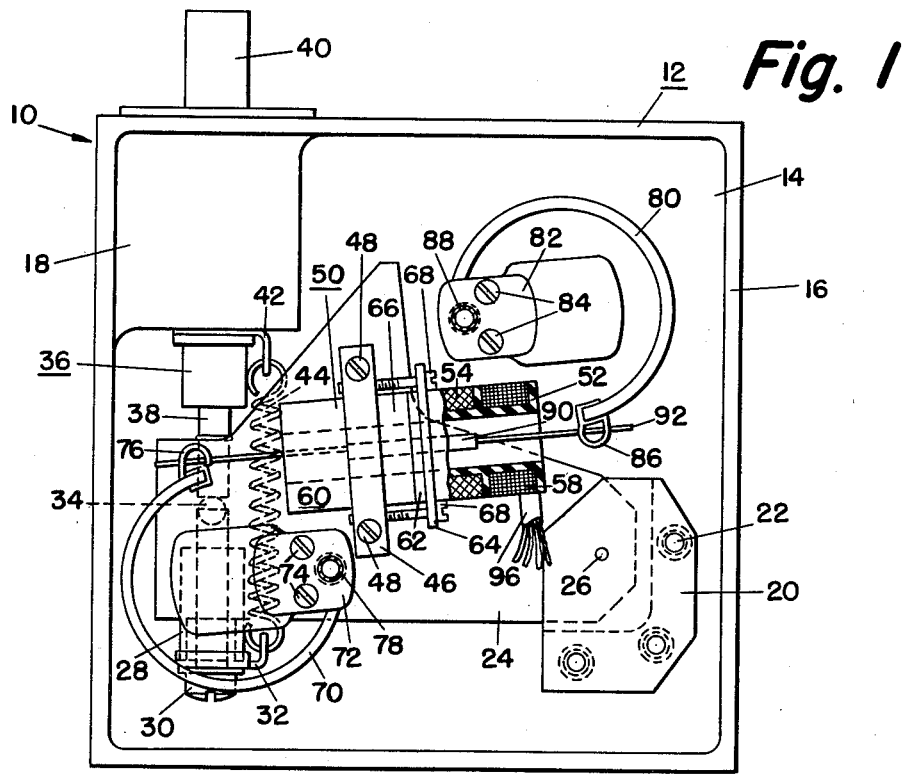
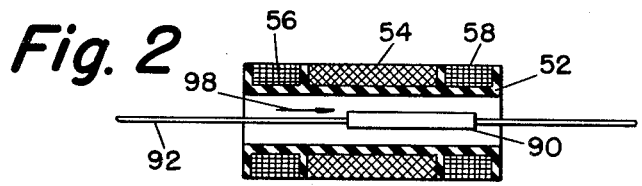
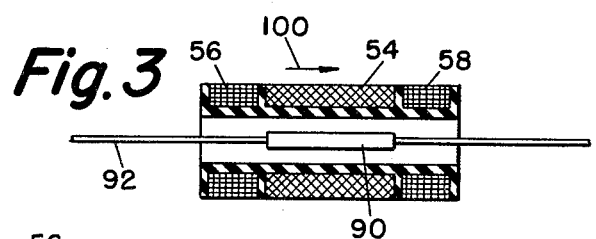
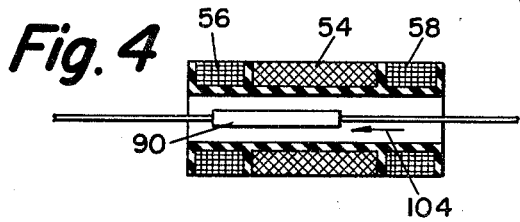
INVENTOR.
WILLIAM B. PEGRAM
BY
ATTORNEY 3,048,040
PRESSURE RESPONSIVE DEVICE
William B. Pegram, Swarthmore, Pa., assignor to International Resistance Company, Philadelphia, Pa.
Filed May 5, 1959, Ser. No. 811,125
5 Claims. (Cl. 73—412)

The present invention relates to a pressure responsive device, and more particularly to a pressure responsive device for use in measuring or controlling pressures or pressure differentials.

There are many operations in which it is desirable to control the operation based on a pressure or pressure differential. For example, in the chemical industry, there are many operations which require that the system in which the operation is taking place be maintained at a constant pressure. Also, when metering flowing fluids by means of a device such as an orifice, venturi tube, or Pitot tube, an instrument is required which is sensitive to the differences of two fluid pressures, and which is capable of actuating a mechanism for controlling the fluid flow. For such operations, it is not only desirable to have a pressure responsive device which can measure or control a single pressure or pressure differential, but it is often desirable to have a pressure responsive device which can be easily varied to control any pressure or pressure differential over a wide range of pressures or pressure differentials.

It is an object of the present invention to provide a novel pressure responsive device.

It is another object of the present invention to provide a pressure responsive device for measuring or controlling a pressure or pressure differential.

It is still another object of the present invention to provide a pressure responsive device for controlling a pressure or pressure differential which is variable for controlling any pressure or pressure differential over a range of pressures or pressure differentials.

It is a further object of the present invention to provide a pressure responsive device for measuring or controlling pressures or pressure differentials the operation of which is unaffected by the pressure conditions immediately surrounding the device.

It is a still further object of the present invention to provide a pressure responsive device which can be pre-set from external information to a desired pressure or pressure differential.

Other objects will appear hereinafter.

FIGURE 1 is a top elevational view, partly sectioned, of the pressure responsive device of the present invention.

FIGURES 2, 3, and 4 are sectional views of the electrical component of the pressure responsive device of the present invention, illustrating various steps in the operation of the pressure responsive device.

Referring initially to FIGURE 1, the pressure responsive device of the present invention is generally designated as 10.

Pressure responsive device 10 comprises a casing 12 having a bottom wall 14, side walls 16, and a substantially rectangular boss 18 extending upwardly from the bottom wall 14 in one corner of the casing 12. A bracket 20 is mounted on the bottom wall 14 of the casing 12 in the corner of the casing 12 diagonally opposite the boss 18. Bracket 20 is secured to the bottom wall 14 by screws 22. Bracket 20 has a slot, not shown, in its corner facing the boss 18, which slot is parallel to the bottom wall 14 of the casing 12. A plate 24 has one end fitting in the slot in the bracket 20. A pin 26 extends through the bracket 20 and the end of the plate 24 which is in the slot in the bracket 20, so that the plate 24 is pivotably supported on the bracket 20. Plate 24 is supported by the bracket 20 parallel to the bottom wall 14 of the casing 12, but with the bottom surface of the plate 24 spaced from the bottom wall 14. A tubular member 28 is secured to the bottom surface of the plate 24 adjacent the free end of the plate 24. Tubular member 28 is mounted in alignment with one side of the boss 18 of the casing 12. A headed screw 30 is threaded through the tubular member 28. A spring mounting clip 32 is secured to the end of the tubular member 28 by the screw 30. A ball 34 is mounted in the end of the screw 30. A standard micrometer device 36 extends through and is supported in the boss 18 in alignment with the screw 30. The end of the output shaft 38 of the micrometer device 36 engages the ball 34 in the end of the screw 30. The drive knob 40 of the micrometer device 36 projects outwardly from the wall 16 of the casing 12. A spring mounting clip 42 is secured to the side of the boss 18. A helical spring 44 extends beneath the plate 24, and is secured at its ends to the spring mounting clips 32 and 42. Spring 44 is under tension, so that the spring 44 pulls the free end of the plate 24 toward the boss 18, and thereby holds the ball 34 against the end of the output shaft 38 of the micrometer device 36. Rotation of the drive knob 40 of the micrometer device 36 threads the output shaft 38 of the micrometer device 36 in and out so as to pivot the plate 24.

A mounting plate 46 is secured in an upright position on the plate 24 by screws 48. Mounting plate 46 has a hole therethrough, not shown, through which an electrical differential transformer 50 extends. In the embodiment of the pressure control device 10 shown differential transformer 50 is of the type comprising a tubular bobbin 52, a primary inductance winding 54 around the central portion of the bobbin 52, and a pair of secondary inductance windings 56 and 58 around the bobbin 52 on opposite sides of the primary winding 54. The secondary coils 56 and 58 are connected in bucking series arrangement. By bucking series arrangement it is meant that the secondary windings 56 and 58 are connected so that a current induced in the secondary winding 56 will be of opposite polarity to a current induced in the secondary winding 58. Thus, if the currents induced in the secondary windings 56 and 58 are of the same magnitude, the currents will balance each other so that the total output of the secondary windings 56 and 58 will be zero. However, the differential transformer 50 may be of any other well known construction which provides a null point and an output signal upon movement of a core in either direction from the null point.

A protective sleeve 60 extends around the bobbin 52 and the inductance windings 54, 56, and 58, and is secured to the bobbin 52. Sleeve 60 has an annular flange 62 extending radially outwardly therefrom. An annular clamping ring 64 surrounds the sleeve 60, and engages the side of the flange 62 opposite to the mounting plate 46. A spacer ring 66 extends around the sleeve 60 between the flange 62 and the mounting plate 46. Screws 68 extend through the clamping ring 64 and are threaded into the mounting plate 46 so as to tightly clamp the flange 62 and the spacer ring 66 between the clamping ring 64 and the mounting plate 46. Thus, the differential transformer 50 is secured to the mounting plate 46.

A Bourdon tube 70 is mounted on the top surface of the plate 24 adjacent the free end of the plate 24. One end of the Bourdon tube 70 is secured in a mounting body 72, which is secured to the plate 24 by screws 74. Bourdon tube 70 circles around the mounting body 72, with the free end of the Bourdon tube 70 being adjacent one end of the differential transformer 50, and substantially in alignment with the longitudinal axis of the bobbin 52 of the differential transformer 50. The free end of the Bourdon tube 70 is sealed closed, and a clip 76 is mounted on the free end of the Bourdon tube 70. A flexible inlet duct 78 extends through the mounting body 72 to the end of the Bourdon tube 70 to permit admission of a pressure medium to the interior of the Bourdon tube 70. Inlet duct 78 extends through the casing 12 or is connected to an outlet fitting (not shown) mounted on the casing 12.

A second Bourdon tube 80 is mounted on the bottom wall 14 by the casing 12 adjacent the pivoted end of the plate 24. One end of Bourdon tube 80 is secured in a mounting body 82 which is secured to the bottom wall 14 by screws 84. Bourdon tube 80 circles around the mounting body 82, with the free end of the Bourdon tube 80 being adjacent the end of the differential transformer 50, and substantially in alignment with the longitudinal axis of the bobbin 52 of the differential transformer 50. The free end of the Bourdon tube 80 is sealed closed, and a clip 86 is secured to the free end of the Bourdon tube 80. An inlet duct 88 extends through the mounting body 82 to the end of the Bourdon tube 80 to permit admission of a pressure medium to the interior of the Bourdon tube 80. Inlet duct 88 also extends through the casing 12 or is connected to a fitting (not shown) mounted on the casing 12.

The mounting bases 72 and 82 for the Bourdon tubes 70 and 80 are mounted adjacent opposite ends of the differential transformer 50, and at opposite sides of the differential transformer 50. The free ends of the Bourdon tubes 70 and 80 are adjacent opposite ends of the differential transformer 50, and the Bourdon tubes 70 and 80 curve away from the ends of the differential transformer 50 in opposite directions. Thus, when pressure is applied to the interior of the Bourdon tubes 70 and 80, the free ends of the Bourdon tubes 70 and 80 will move away from each other in opposite directions.

A core 90 comprising an elongated rod of a magnetic material is movably disposed within the bobbin 52 of the differential transformer 50. Core 90 is of a length longer than the length of the primary inductance winding 54 of the differential transformer 50. A relatively stiff wire or ribbon 92 of a non-magnetic material extends longitudinally through and is secured to the core 90. The wire 92 extends longitudinally from the ends of the core 90, and projects beyond the ends of the differential transformer 50. One free end of the wire 92 is secured to the clip 76 on the free end of the Bourdon tube 70 and the other free end of the wire 92 is secured to the clip 86 on the free end of the Bourdon tube 80. Thus, the core 90 is supported between the free ends of the Bourdon tubes 70 and 80 for longitudinal movement through the differential transformer 50.

The casing 12 may include a cover plate, not shown, which is secured across the top of the side wall 16 of the casing 12 to prevent dirt and moisture from entering the casing 12, and to prevent damaging the pressure responsive device during the handling and use of the device. The inlet ducts 78 and 88 extend through the casing 12, so that they can be connected to the source of pressure being controlled. The terminal wires 96 of the inductance windings of the differential transformer 50 also extend through the casing 12 to permit the differential transformer 50 to be electrically connected to a device for controlling the pressure being controlled.

The operation of the pressure responsive device 10 of the present invention to control a pressure or pressure differential is as follows:

In order to fully understand the operation of the pressure responsive device 10 of the present invention, it should be noted that the Boudon tubes 70 and 80 are metal tubes which are fixed at one end and free at the other end. Thus, if the Bourdon tubes 70 and 80 are moved from their normal position, either by an internal pressure force or by an external force, the Bourdon tubes 70 and 80 will be internally stressed in the same manner as a spring. Like a spring, the internal stressing of the Bourdon tubes 70 and 80 will provide a force at the free ends of the Bourdon tubes 70 and 80 on the wire 92 which force will be hereinafter referred to as the "spring force" of the Bourdon tubes. Thus, if either of the Bourdon tubes 70 or 80 is moved from its normal position by an internal pressure force, the force at the free end of the Bourdon tube will be a combination of the internal pressure force and the spring force of the Bourdon tube. It should also be noted that any force applied to the wire 92 by the Bourdon tubes 70 and 80 will be in opposite directions.

One method of using the pressure responsive device 10 of the present invention is to open the inlet tube 78 to the Bourdon tube 70 to the atmosphere, and to connect the inlet tube 88 to the Bourdon tube 80 to the pressure to be controlled. If the pressure to be controlled is also atmospheric pressure, the forces applied to the wire 92 by the Bourdon tubes 70 and 80 will be equal and opposite, so that the core 90 will be maintained in the position shown in FIGURE 1. The core 90 is positioned between the ends of the Bourdon tubes 70 and 80 so that when atmospheric pressure is in both of the Bourdon tubes 70 and 80 and the plate 24 is positioned substantially intermediate its limits of pivotal movement, the core 90 will be in its null position. The null position of the differential transformer 50 is the position when the core 90 extends across the same number of turns of each of the secondary windings 56 and 58 of the differential transformer 50. In the null position of the differential transformer 50, when an A.C. current is placed on the primary winding 54, the currents induced in the secondary windings 56 and 58 will be of equal magnitude. Since the secondary windings 56 and 58 are connected in bucking series arrangement, the currents induced in the secondary windings 56 and 58 will balance each other so that the total output of the secondary windings will be zero.

With the differential transformer 50 in its null position, and the output of the differential transformer 50 being connected to a device for controlling the pressure to be controlled, the pressure responsive device 10 of the present invention will control any variations in the pressure to be controlled. Thus, if the pressure to be controlled, which is connected to the Bourdon tube 80, increases, the increase in pressure will cause the free end of the Bourdon tube 80 to move away from the end of the differential transformer 50. This in turn, will move the core 90 in the direction of arrow 98 in FIGURE 2, and will pull the free end of the Bourdon tube 70 toward the end of the differential transformer 50. The core 90 will be moved until the spring force applied to the wire 92 by the Bourdon tube 70 equals the combined pressure force in the Bourdon tube 80 and the spring force of the Bourdon tube 80 applied to the wire 94. The core 90 will then be in a position with respect to the differential transformer 50 as shown in FIGURE 2. In this position of the core 90, the core 90 extends across a greater number of turns of the secondary winding 58 then of the secondary winding 56. Thus, the induced current in the secondary winding 58 will be greater than the induced current in the secondary winding 56, so that an output signal will be provided from the differential transformer 50 to actuate the device for controlling the pressure being controlled. When the pressure being controlled is reduced back to atmospheric pressure, the core 90 will return to the null position of the differential transformer 50.

If the pressure to be controlled is greater than atmospheric pressure when the inlet duct 88 to the Bourdon tube 80 is connected to the pressure to be controlled, the core 90 will be immediately moved to a position such as shown in FIGURE 2. The differential transformer is then adjusted to its null position. This is achieved by rotating the drive knob 40 of the micrometer device 36 to pivot the plate 24 toward the boss 18. This pivots the differential transformer 50 so that it moves along the core 90 in the direction indicated by arrow 100 in FIGURE 3. Pivotation of plate 24 also pivots the Bourdon tube 70. This moves the free end of the Bourdon tube 70 toward the differential transformer 50 and the free end of the Bourdon tube 80 away from the differential transformer 50 and thereby decreases the spring force in the Bourdon tubes 70 and 80. When the plate 24 has been pivoted sufficiently for the free end of the Bourdon tube 70 to be spaced from the differential transformer 50 the same distance that it was when the core 90 was in its null position with atmospheric pressure being in both of the Bourdon tubes 70 and 80, the core 90 will then again be in its null position.

If the pressure to be controlled then increases, the core 90 will be moved with respect to the differential transformer 50 in the direction of arrow 98. This will produce an output signal from the differential transformer 50 of the polarity of the secondary winding 58 which will operate the device for controlling the pressure being controlled to reduce the pressure. The pressure being controlled will be reduced until the core 90 returns to its null position. If the pressure being controlled decreases from the desired pressure, the pressure force of the Bourdon tube 80 will decrease, and the core 90 will move in the direction of arrow 102 in FIGURE 4. The core 90 will then extend across more turns of the secondary winding 56 then of the secondary winding 58 so as to produce an output signal from the differential transformer 50 of the polarity of the secondary winding 56. The output signal of the differential transformer 50 will then operate the device controlling the pressure being controlled to increase the pressure until the core 90 is returned to its null position.

Thus, with the inlet duct 78 to the Bourdon tube 70 open to the atmosphere, and the inlet duct 88 to the Bourdon tube 80 connected to the pressure to be controlled, the pressure responsive device 10 of the present invention provides a gage pressure control device having a pre-set null point at any desired pressure. Since neither of the Bourdon tubes 70 and 80 are open to the pressure within the casing 12, and the Bourdon tubes 70 and 80 apply forces on the core 90 in opposite directions, any changes in the pressure within the container 12 will affect both Bourdon tubes in the same manner so that the effect will be cancelled out. Thus, any changes in the pressure within the casing 12 will have no effect on the operation of the pressure responsive device 10 of the present invention.

If the Bourdon tube 70 instead of being open to the atmosphere, is evacuated and the inlet duct 78 sealed off, the pressure responsive device 10 will operate in the same manner as previously described as an absolute pressure control device having a pre-set null point at any desired pressure. With the Bourdon tube 70 evacuated and completely sealed off, not only will changes in the pressure within hte container 12 not affect the movement of the core 90, but also any changes in pressure caused by changes in temperature around the device 10 will not affect the operation of the device 10.

The pressure responsive device 10 of the present invention cannot only be used to control a pressure, but can also be used to control a pressure differential. To control a pressure differential, such as the difference in pressure across an orifice or venturi, the inlet duct 78 to the Bourdon tube 70 is connected to one side of the orifice or venturi, and the inlet duct 88 to the Bourdon tube 80 is connected to the other side of the orifice or venturi. The difference in the pressures applied within the Bourdon tubes 70 and 80 will cause the core 90 to move to a particular position. The differential transformer 50 is then moved with respect to the core 90 to the null position of the differential transformer 50 by rotating the drive knob 40 of the micrometer device 36 to pivot the plate 24. With the differential transformer 50 at its null position, any changes in the pressure differential across the orifice or venturi will cause the core 90 to move, and thereby produce an output signal from the differential transformer 50. The output signal from the differential transformer 50 will then operate a device for controlling the flow through the orifice or venturi to re-obtain the desired pressure differential across the orifice or venturi. Thus, the pressure responsive device 10 of the present invention can be used to control differences in pressure, and will show up differences in pressure which are very small as compared to the pressures being compared.

If the Bourdon tubes 70 and 80 are of unequal pressure range, and are both connected to a pressure source, and if the pressures in the Bourdon tubes 70 and 80 are equal, the Bourdon tubes 70 and 80 will apply unequal forces on the core 90 to move the core 90. To maintain the core 90 in a single position, the pressures in the Bourdon tubes 70 and 80 must be unequal, and at a ratio compared with the ratio of the pressure ranges of the Bourdon tubes 70 and 80. Thus, using Bourdon tubes which are of unequal pressure ranges, the pressure responsive device 10 of the present invention can be used to control a constant pressure ratio.

The present invention may be embodied in other specific forms without departing from the spirit or essential attributes thereof and, accordingly, reference should be made to the appended claims, rather than to the foregoing specification as indicating the scope of the invention.

I claim:

1. A pressure responsive device comprising a base, a plate pivotably mounted at one end on said base, an electrical differential transformer mounted on said plate, a core movably disposed within said differential transformer, a pressure sensitive device mounted on said plate adjacent one end of said differential transformer, said pressure sensitive device being connected to one end of said core, a second pressure sensitive device mounted on said base adjacent the other end of said differential transformer, said second pressure sensitive device being connected to the other end of the core, and means for pivoting said plate to a selective position with respect to said base.

2. A pressure responsive device in accordance with claim 1 in which said pressure sensitive devices act on said core in opposite directions.

3. A pressure responsive device in accordance with claim 1 in which each of said pressure sensitive devices comprises a Bourdon tube fixedly mounted at one end and having a free end which is connected to the core.

4. A pressure responsive device in accordance with claim 3 in which the free ends of said Bourdon tubes are adjacent opposite ends of the differential transformer, and the Bourdon tubes curve away from the ends of the differential transformer in opposite directions, with the fixed ends of the Bourdon tubes being mounted at opposite sides of the differential transformer.

5. A pressure responsive device in accordance with claim 1 in which the means for pivoting the plate comprises a micrometer device mounted on said base with the output shaft of the micrometer engaging the plate, and a spring under tension connected between the plate and the base and holding the plate against the output shaft of the micrometer.

References Cited in the file of this patent

UNITED STATES PATENTS

| 2,549,625 | Moore | Apr. 17, 1951 |
| 2,605,638 | Pearson | Aug. 5, 1952 |
| 2,827,787 | Kroeger | Mar. 25, 1958 |
| 2,866,332 | Sherman | Dec. 30, 1958 |
| 2,935,875 | Eggers et al. | May 10, 1960 |